UNITED STATES PATENT OFFICE.

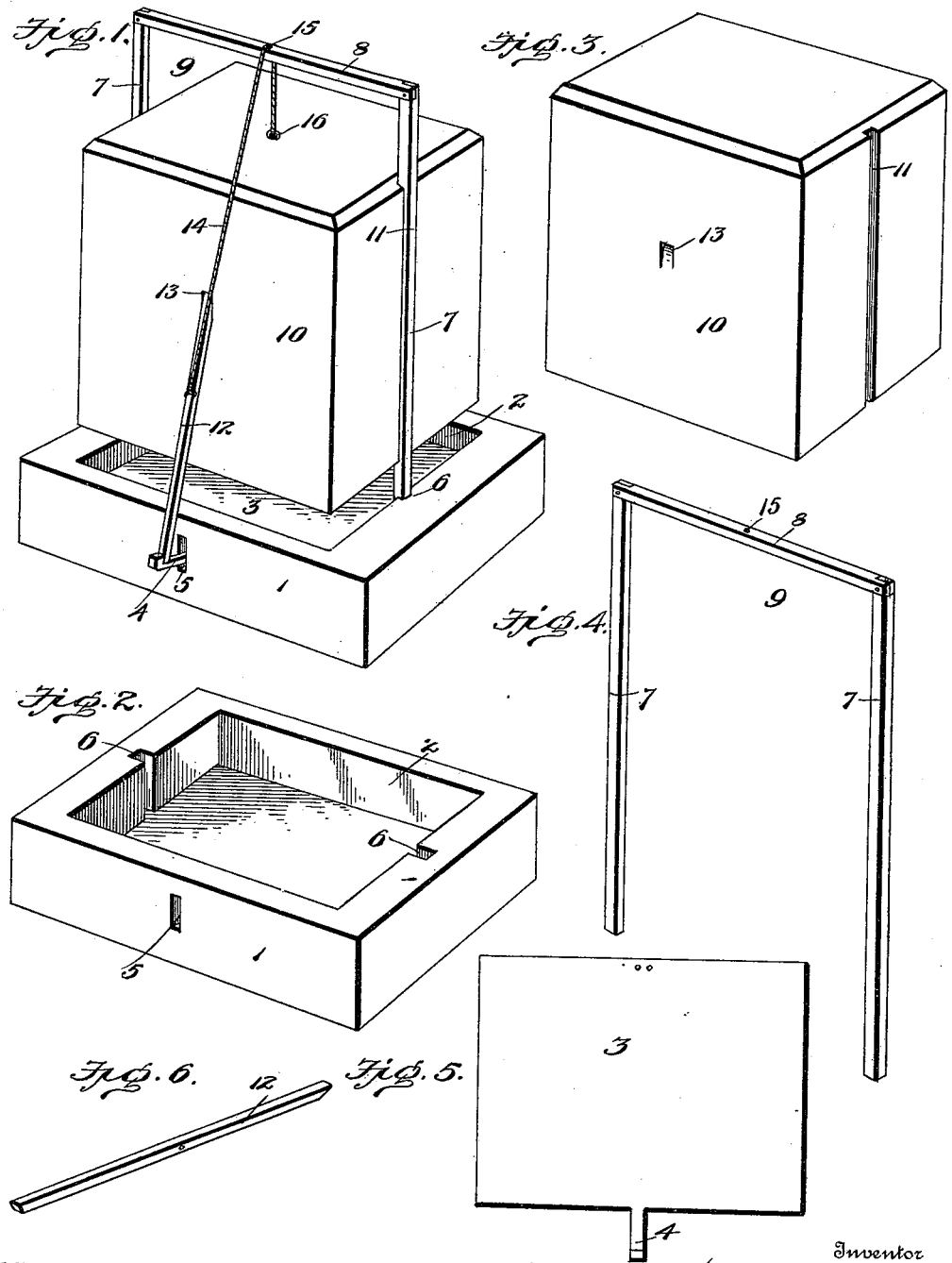

CHARLES HENRY BOETTCHER, OF LINCOLN, NEBRASKA.

ANIMAL-TRAP.

SPECIFICATION forming part of Letters Patent No. 623,870, dated April 25, 1899.

Application filed January 28, 1899. Serial No. 703,719. (No model.)

*To all whom it may concern:*

Be it known that I, CHARLES HENRY BOETTCHER, a citizen of the United States, residing at Lincoln, in the county of Lancaster and State of Nebraska, have invented certain new and useful Improvements in Animal-Traps; and I do declare the following to be a full, clear, and exact description of the invention, such as will enable others skilled in the art to which it appertains to make and use the same.

The invention has relation to animal-traps; and the object of the invention is to provide a simple and inexpensive device of this character which shall be reliable in its action and easily constructed.

With this object in view the invention consists in certain features of construction and combination of parts, which will be hereinafter fully described and claimed.

In the drawings, Figure 1 is a perspective view of my trap, showing it set. Fig. 2 is a similar view of the base-piece. Fig. 3 is a similar view of the drop-block. Fig. 4 is a similar view of the frame. Fig. 5 is a plan view of the trigger-board, and Fig. 6 is a perspective view of the locking-pin.

In the drawings, 1 denotes the base-board, provided in its upper face with a deep recess 2, in which is located a trigger-board 3, one edge of which has a pivotal engagement with one wall of the recess and the other edge of which is provided with a trigger 4, that projects through an aperture 5 in the front wall of the base.

6 denotes vertical recesses secured in the end walls of the recess to receive the uprights 7, which in connection with the cross-bar 8, secured at the upper end of the uprights, forms the block-supporting frame 9.

10 denotes a drop-block provided in its sides with vertical grooves 11, that embrace the uprights of the block-supporting frame and serve to guide the block into the recess in the base-piece.

12 denotes a locking-pin, one end of which engages the trigger and the other end of which engages the end wall of an inclined recess 13, formed in the face of the drop-block. Attached to this locking-pin is a cord 14, which passes through an aperture 15 in the cross-piece of the supporting-frame and engages a screw-eye 16, secured to the drop-block.

In operation after the trap has been baited, which may be done by placing the bait upon the trigger-board, and the animal steps upon said board the trigger will be depressed and will release the lower end of the locking-pin, which end will fly upwardly and its other end be released from the shoulder of the recess of the drop-block, permitting the block to drop and imprison the animal.

From the foregoing description, taken in connection with the accompanying drawings, the construction, operation, and advantages of my improved animal-trap will be readily apparent to those skilled in the art without requiring an extended explanation.

Having thus described the invention, what is claimed, and desired to be secured by Letters Patent, is—

The combination with the base-block having in its upper face a deep recess, the end walls of which are formed with vertical slots, and the front wall of which is formed with a through-aperture, a supporting-frame, the lower ends of the vertical portion of which are secured in said end slots, a trigger-board located in the recess in the base and having one edge hinged to one of the walls of the base, and provided with a trigger that projects through the aperture in the front wall of the base, a drop-block having vertical grooves in its sides to embrace the uprights of the supporting-frame, a locking-pin one end of which is engaged with the trigger and the other end with the wall of the recess formed in the drop-block, and a cord or cable connected to the drop-pin intermediate its ends and passing through an aperture in the cross-piece of the supporting-frame and secured to the drop-block, substantially as and for the purpose set forth.

In testimony whereof I have hereunto set my hand in presence of two subscribing witnesses.

CHARLES HENRY BOETTCHER.

Witnesses:
 F. A. BOEHMER,
 H. E. WOOD.